United States Patent [19]
Hashimoto et al.

[11] Patent Number: 5,864,440
[45] Date of Patent: Jan. 26, 1999

[54] DATA PROCESSING METHOD AND DATA STORAGE SYSTEM

[75] Inventors: Minoru Hashimoto, Sagamihara; Jon Haswell, Fujisawa; Tatsuya Sakai, Yamato; Mario Yamaguchi, Yokohama, all of Japan

[73] Assignee: International Business Machines Corporation, Armonk, N.Y.

[21] Appl. No.: 569,326

[22] Filed: Dec. 6, 1995

[30] Foreign Application Priority Data

Dec. 27, 1994 [JP] Japan ................................. 6-324716

[51] Int. Cl.⁶ ........................................... G11B 20/18
[52] U.S. Cl. ..................... 360/53; 360/78.14; 360/49; 360/40
[58] Field of Search ........................... 360/48, 53, 49, 360/31, 40

[56] References Cited

U.S. PATENT DOCUMENTS

| | | | |
|---|---|---|---|
| 4,813,011 | 3/1989 | Kulakowski et al. | 360/78.14 |
| 5,136,592 | 8/1992 | Weng | 371/39.1 |
| 5,438,559 | 8/1995 | Best et al. | 369/54 |
| 5,500,848 | 3/1996 | Best et al. | 360/48 X |
| 5,517,631 | 5/1996 | Machado et al. | 395/438 |
| 5,523,903 | 6/1996 | Hetzler et al. | 360/48 X |
| 5,561,566 | 10/1996 | Kigami et al. | 360/53 X |

*Primary Examiner*—Aristotelis M. Psitos
*Assistant Examiner*—K. Wong
*Attorney, Agent, or Firm*—Thomas R. Berthold

[57] ABSTRACT

When writing user data D, the user data D is stored in a register 46, and using both the user data D and the sector information (ID) of the user data D, an error correction code ECC is generated by an ECC generation algorithm Ar. A stored information Rw made up of the user data D and the generated ECC is written on a disk. In the reading, the user data Dr of a read record Rr is temporarily stored in the register 46, and an ECC check algorithm is executed. This ECC check is executed for combined data of the user data Dr and its position information. When any error is found in the position information portion in the combined data, the user data is determined that the read user data is wrongly addressed. When an error is found in the user data Dr portion, the user data is corrected by ECC and the corrected user data is output.

9 Claims, 7 Drawing Sheets

```
ABA   00 01 02 03 04 05 06 07 08 09 10 11 12 13 14 15 16 17 18 19
LBA   00 01 02 -- 03 04 05 06 -- 07 08 09 10 11 -- -- 12 13
PLBA        03                 07 07                12 12 12
D_LST 03, 07, 07, 12, 12, 12, ...
```

DATA PROCESSING METHOD AND DATA STORAGE SYSTEM

FIELD OF THE INVENTION

The present invention relates to a data processing method and a system, and more particularly to a method and an apparatus for storing user data with error correction code in a disk and reading them correctly.

BACKGROUND OF THE INVENTION

Recently, as a data recording medium for storing information, a hard disk drive unit (hereinafter referred to as a HDD unit) is being commonly used. In the HDD unit, a plurality of magnetic recording disks (hereinafter referred to as a disk) is provided, and a read/write head is positioned on a desired track defined on the disk for recording or reading information on/from the disk. A plurality of tracks is provided on the disk of the HDD unit, and each track is divided into data sectors (hereinafter referred to as sectors) of 128,256,512 (bytes), etc., with each sector given an identifier (so-called sector ID) representing itself.

In a conventional HDD unit, to improve the reliability of recorded data, a sector ID is recorded for every sector. This sector ID is used for an identification of the position on the disk. When reading or writing from/on a disk, this sector ID is referred to for identifying the data position. Since the sector ID must be referred to in each sector, the ID must be written in each sector. For this ID region, the user data region is reduced.

Recently, for increasing the user data region, an ID-less or headerless architecture for a disk was proposed. The headerless disk has a new sector format. In this new format, the ID region is not provided for each sector and no ID region is needed for recording information. A headerless disk architecture is described in IBM's U.S. Pat. No. 5,438,559.

In a headerless disk, the physical position (ABA: Absolute block Address) and the logical position (LBA: Logical Block Address) on the disk are previously made to correspond to each other and stored in a memory, and from this correspondence relationship, the read/write head is positioned on a desired track of the disk to perform the information recording on the disk or the information reading from the disk. However, in the conventional HDD unit provided with the NO_ID disk, the read/write head is positioned by using the above mentioned physical positions (ABA) which correspond to a logical position (LBA) on one-to-one basis. This address conversion procedure for retrieving the physical position from the logical position is executed independently from the data reading or writing operation, so the data write or read operation can be started without recognizing that the head is accurately positioned or not. Such an error can happen when an external factor such as a HDD vibration occurs.

In view of the above fact, it is the object of the present invention to provide a data processing method and a system which can improve the reliability of the data stored on a disk without reducing the capacity.

SUMMARY OF THE INVENTION

To accomplish the above object, the present invention provides a new data processing method executed in an HDD having a read/write head which can be positioned by using previously stored position information. According to this new data processing method, the data written on a disk comprises the user data and the error correction code (ECC) which is generated from the user data and the positional information corresponding to the user data location on the disk.

A present invention further provides a new data processing method executed in an HDD having a read/write head which can be positioned by using previously stored position information. According to this new data processing method, an error correction code is generated from the combined data comprising the user data to be written on a disk and the positional information representing the user data location on the disk. And both the generated error correction code and the user data are written on the disk.

In addition, in the data reading operation, the user data and the positional information are combined and this combined data bit sequence is checked by using the error correction code (ECC). When any error is found by this ECC checking, the data correction for the user data is executed.

In the above data checking operation, if an error is detected in the bit portion of the positional information, it can be determined that the read user data is not the data located on the addressed position on the disk.

In accordance with the present invention, positional information representing the data location on a disk is previously prepared. An error correction code is generated from the combined data comprising both the user data and the positional information. The positional information includes track information for identifying a track position, and sector information for identifying a sector (so-called sector ID). In this invention, an error correction code, which is also referred to as simply ECC in this specification, can be any type of a code capable of detecting and correcting errors, such as a syndrome which is calculated from the data to be corrected. The user data and the error correction code are written or read on/from a disk. The error correction code (ECC) is used when a data correction is executed.

In addition, error correction code is generated from the combined data which comprises both the user data and the position information which corresponds to the user data location on the disk. Therefore, the error correction code can also be used for detecting errors of the position information.

As described above, the data read from a disk is comprising both the user data and the error correction code. This error correction code is generated from the combined data comprising both the user data and the positional information. So by using this error correction code, the correctness of the bit patterns comprised from both of user data and the corresponding position information can be determined. When an error is detected in the read user data bit sequence and no error is found in the positional information bit sequence, the user data correction is executed in accordance with the ECC correction method.

If the error correction code detects an error in the bit positions of the positional information bit sequence, the system can determine that the read data is not the data located on the addressed sector on the disk.

DESCRIPTION OF THE PREFERRED EMBODIMENTS

An embodiment of the present invention is now described in detail with reference to the drawings. In this embodiment, the invention is applied to an HDD unit 10 which is using a multi-zone method for data writing and reading on/from a disk. According to this multi-zone method, the data region on a magnetic recording disk is divided into a predetermined number of regions (hereinafter referred to as zones) in the radial direction. Data reading and writing operations are performed by positioning a head on a track of the disk.

Figure 1:
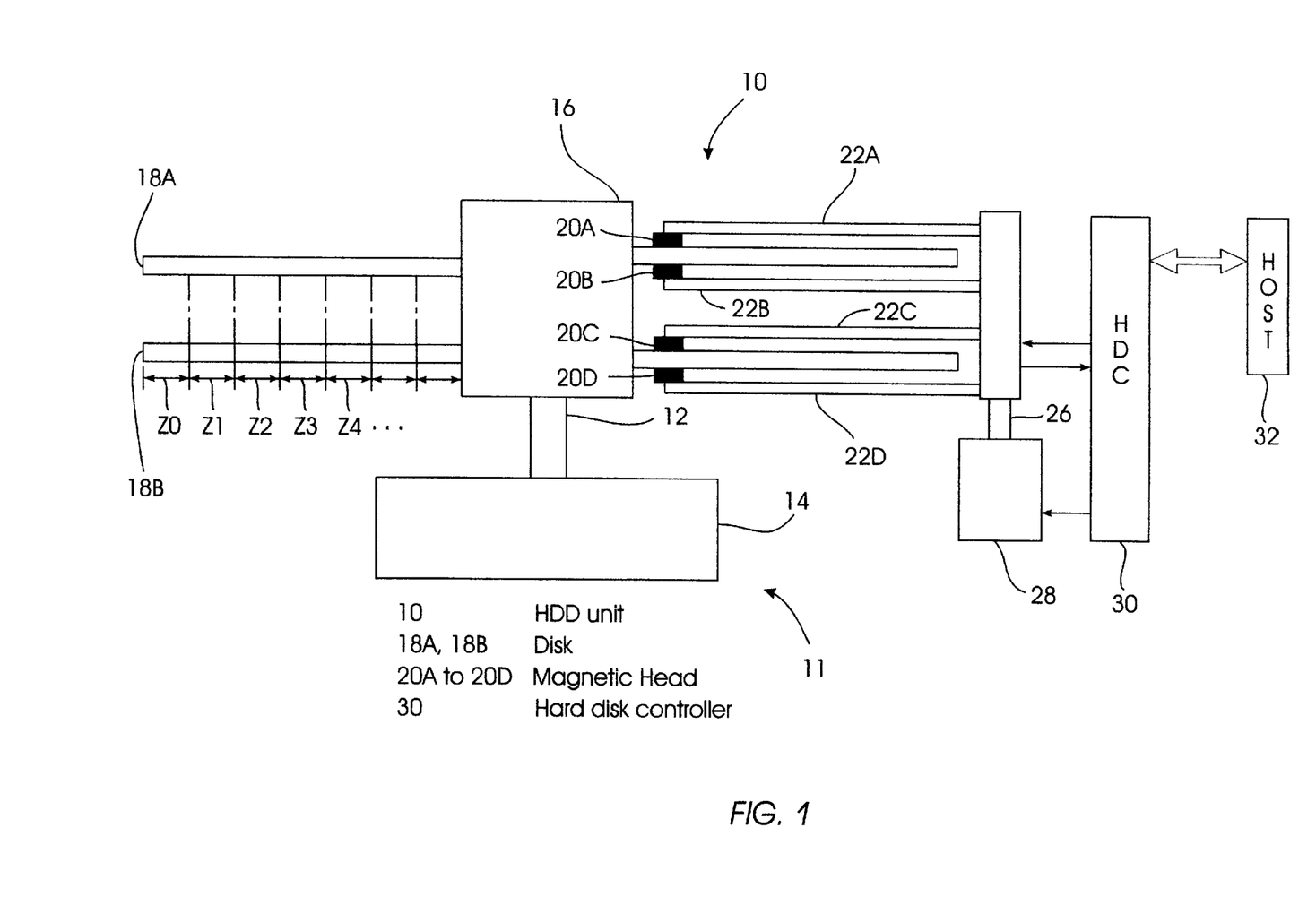
FIG. 1 is a block diagram showing the schematic construction of the HDD unit.

As shown in FIG. 1, the HDD unit 10 related to this embodiment comprises a disk section 11, and a hard disk controller (hereinafter referred to as HDC) 30 including a local CPU.

The disk section 11 includes a drive unit 14 for rotating a shaft 12 at high speed. A cylindrical support member 16 is attached to the shaft 12 so that their axes coincide with each other. On the outer periphery of the support member 16, a plurality of (in FIG. 1, two) disks 18A and 18B are attached so as to be spaced apart from each other by a predetermined distance. The disks 18A and 18B are shaped in a cylinder of a predetermined thickness, and each of them is made of a hard material, both sides of which are coated with a magnetic material so that both sides form recording surfaces. In the center of the disks 18A and 18B, a hole having the substantially same outer diameter as the support member 16 is provided. The support member 16 is inserted into the hole, and the disks 18A and 18B are fixed to the outer periphery of the support member 16. Accordingly, when the shaft 12 is rotated by the drive unit 14, the disks 18A and 18B are rotated integrally with the support member 16.

On the recording surface of each of the disks 18A and 18B, a plurality of servo regions 50 are extended radially on the surface of disk 18. The remaining regions are data track regions 52. In the servo regions 50, a servo signal such as a burst pattern to indicate the head position in regard to a center of data tracks is recorded, and a special code (a no-signal region or the like of the order of 1 micro sec) indicating the start of a servo pattern and a gray code (cyclic binary code) indicating the address of each data track are recorded. Further, in the end portion of a servo region 50 in the direction of rotation, information for generating a sector pulse signal SP representing the end of the servo region 50 (indicating the start of a sector) is recorded. In the data track regions 52, a plurality of data tracks is concentrically formed at a pitch P, and in each data track, information is written by a magnetic head to be described later in a direction of rotation of the disk 18.

The HDD unit 10 includes magnetic heads 20A to 20D having a predetermined head gap width and gap length, which are provided so as to correspond to the recording surface of each of the disks 18A and 18B, respectively. Each magnetic head 20A to 20D typically comprises a read element (not shown), such as a magnetoresistive (MR) read head for reading information, and a write element (not shown), for writing information. Each of the magnetic heads 20A to 20D is attached to the distal end of the corresponding access arms 22A to 22D, and held at a position rather spaced apart (for instance, about 0.1 to 0.2 microns) from the corresponding recording surface of the disks 18A and 18B. The rear ends of the access arms 22A to 22D are attached to a support 24. The support 24 is attached to a drive unit 28 through a shaft 26. The drive unit 28 comprises a digital to analog converter (D/A), an amplifier (AMP), and a voice coil motor (VCM). After the digital signal calculated in the local CPU (not shown) of the HDC 30 is converted to an analog signal in the D/A and amplified at a predetermined multiplying factor in the AMP, the access arms 22A to 22D rotate a predetermined angle corresponding to the supplied signal in the VCM. By the rotation of the access arms 22A to 22D, each magnetic head 20A to 20D moves in the radial direction on each recording surface of the disks 18A and 18B (refer to FIG. 2).

The drive unit 28 is connected to the hard disk controller (hereinafter referred to as HDC) 30. To the HDC 30, the read element and the write element, not shown, of the magnetic heads 20A to 20D are also connected. Further, the HDC 30 is connected to a host computer 32 for inputting/outputting data to be written to a disk or data read out from a disk.

In this embodiment, when a data reading or writing operation is requested from a host to HDD, the data location on the disk is specified by logical block address (LBA). The numbers of LBA are sequentially assigned for the sectors. The actual data stored location is identified by absolute block address(ABA) which skips defective sectors. So the address conversion between ABA and LBA must be executed, when data reading or writing operation is executed. The following description is made to a case in which a formatting is made on the assumption that one sector has a storage capacity of 512 bytes.

Figure 2:
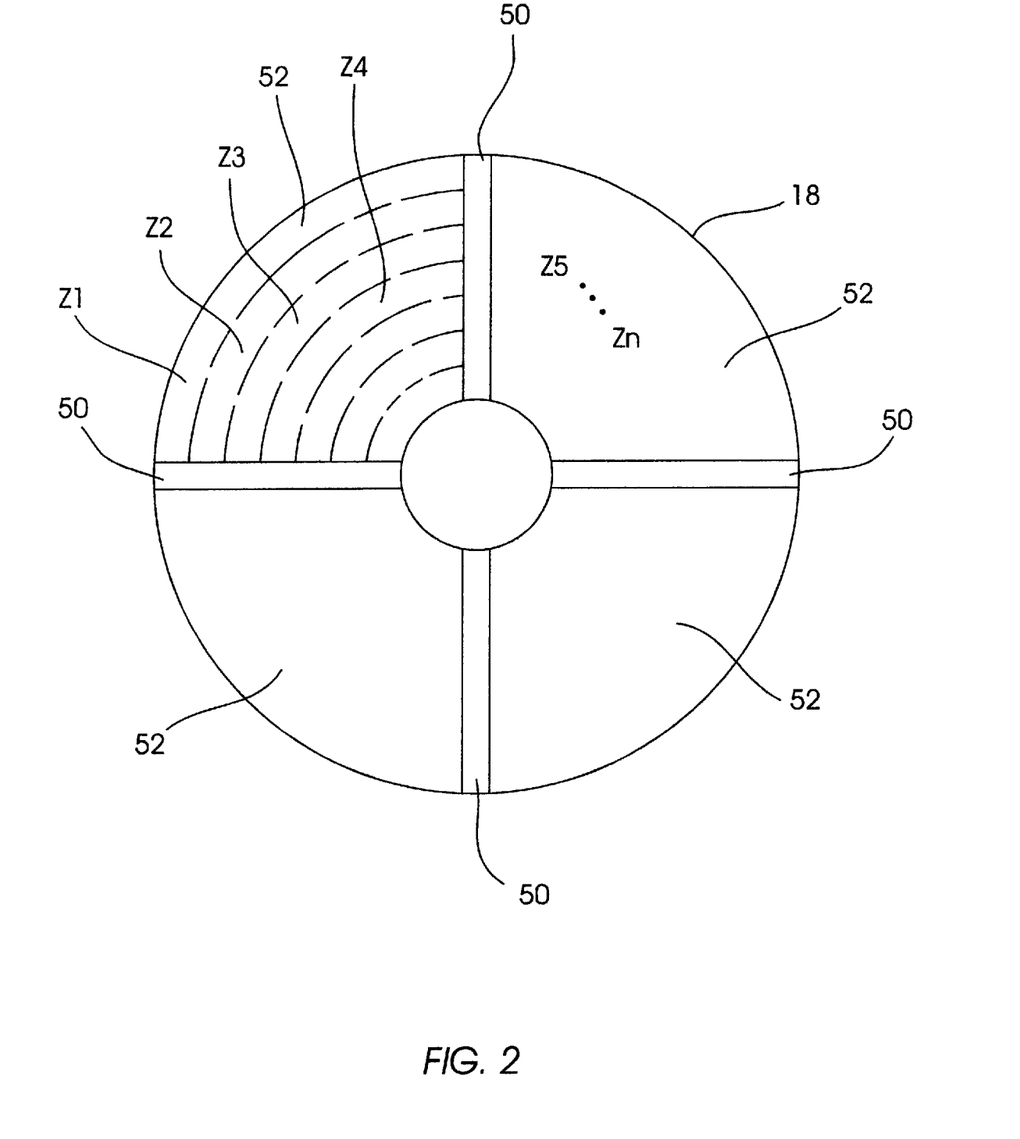
FIG. 2 is a view showing the zones of the disk of the HDD unit.

As shown in FIG. 2, the disks 18A and 18B are radially divided into cylinder regions which are a predetermined number n of zones Z0, Z1, Z2, . . . , Zn, and positional information or the like is predefined for each zone. For instance, at the time of manufacturing, in the zone Z0, the regions from the minimum absolute block address (MIN_ABA)0 to the maximum absolute block address (MAX_ABA) 102399 are saved, 199 cylinders from a cylinder 0, the minimum cylinder number (MIN_CYL), to a final cylinder number (END_CYL) are provided to be used for determining the head position, and a formatting is performed so that the number of sectors (SCT_TRK) contained in one track is 128 and the number of sectors (SCT_CYL) contained in one cylinder is 512. The succeeding zones including the zone Z1 are similar, and there are relationships as shown in the following Table 1. The information on each zone shown in the Table 1 is previously recorded as a zone table 32 at a predetermined position of the disk. By referring to the zone table, from which zone a specified sector starts can be determined.

TABLE 1

ZONE TABLE

| # ZONE | MIN_ABA | MAX_ABA | SCT_TRK | SCT_CYL | MIN_CYL | END_CYL |
|---|---|---|---|---|---|---|
| Z0 | 0 | 102399 | 128 | 512 | 0 | 199 |
| Z1 | 102400 | 191999 | 112 | 448 | 200 | 399 |
| Z2 | 192000 | 345599 | 96 | 384 | 400 | 799 |
| Z3 | 345600 | 473599 | 80 | 320 | 800 | 1199 |

Figure 3:
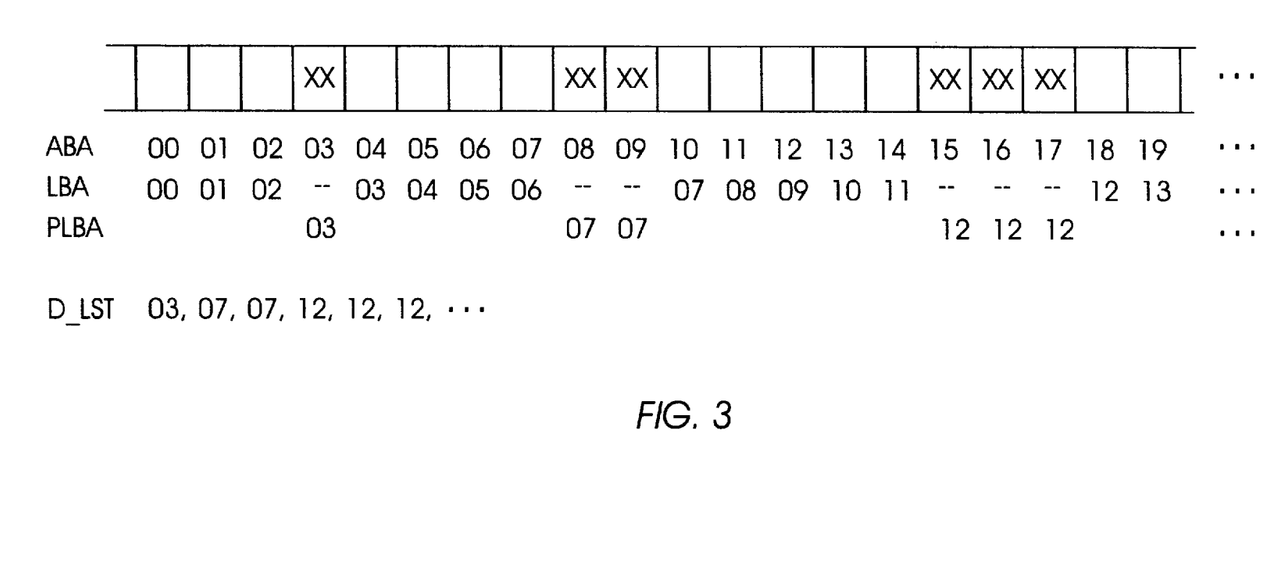
FIG. 3 is a conceptual image view showing an example of the track containing defective sectors.

As to defective sectors, as shown in FIG. 3, if the blocks (sectors) corresponding to absolute block addresses ABA of 03, 08, 09, 15, 16 and 17 are defective, the logical block address LBA is different. For example, the LBA for the absolute block address ABA of 04 is 03, because the logical block address skips the defective sector. For the skipped defective sector whose absolute block address ABA is 03, a value which is assumed to be assigned if it is not defective (in this case, 03) is stored as a value PLBA (PSUEDO LBA). All of the stored values PLBA are sequentially stored as a defect list D-LST.

Accordingly, when a logical block address LBA is specified, an absolute block address ABA can be obtained by adding the number of the values PLBA put on the defect list D_LST, as shown in the following equation (1). That is, for instance, a logical block address LBA=7 is specified, ABA=7+3=10 is obtained by adding the number of the values on the defect list D_LST (in this case, three of 03,07, and 07).

$$ABA = LBA + \text{(the number of PLBA which is equal to or smaller LBA)} \quad (1)$$

Figure 4:
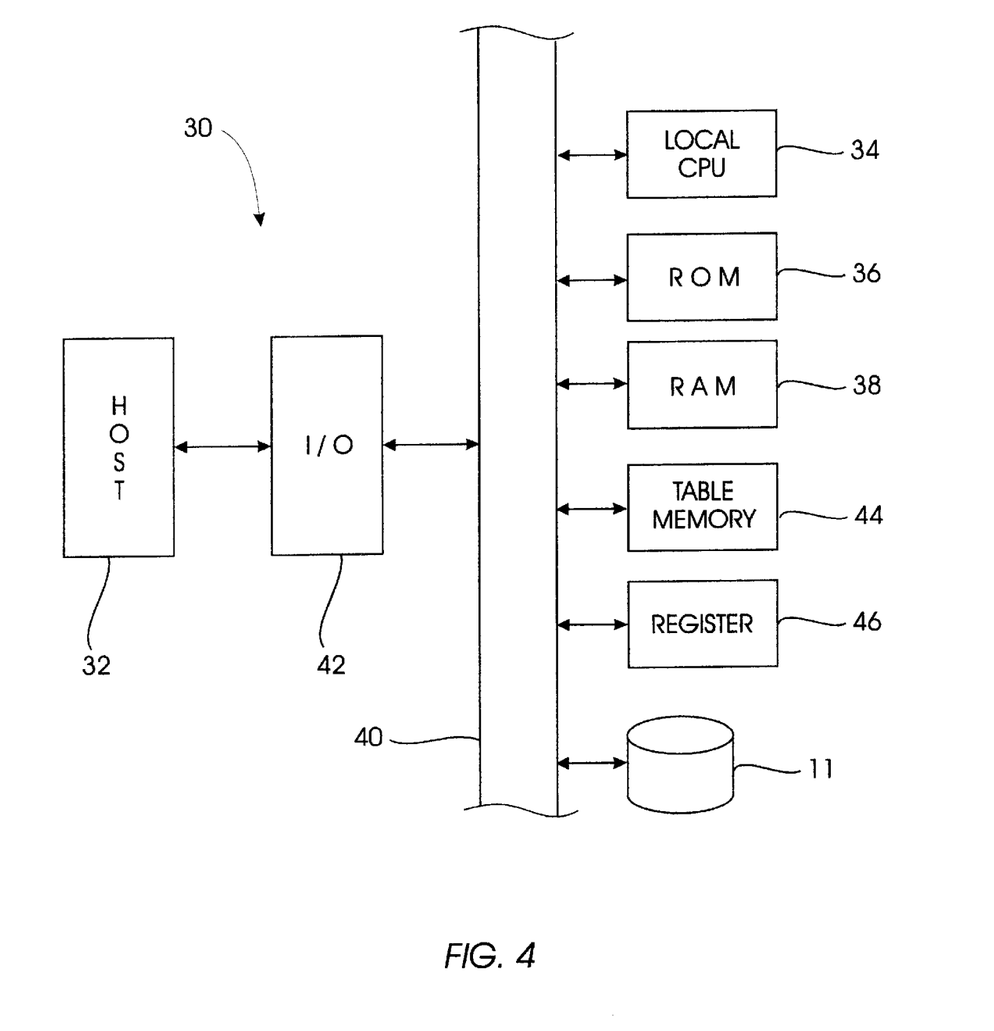
FIG. 4 is a block diagram showing the schematic construction of the hard disk controller (HDC) to which the present invention can apply.

As shown in FIG. 4, the HDC 30 consists of a microcomputer which comprises a local CPU 34, a ROM 36, and a RAM 38, each of which is connected to a bus 40. Connected to the bus 40 are a table memory 44 for storing the above described table, a register 46 for temporarily storing data to be written to the disk or data read out from the disk, and the disk section 11. Also, to the bus 40, a host computer 32 is connected through an input/output interface (I/O) 42.

Now, the operation of the HDD unit 10 of this embodiment is described along with an error correction process for data or the like with reference to the drawings.

Figure 6:
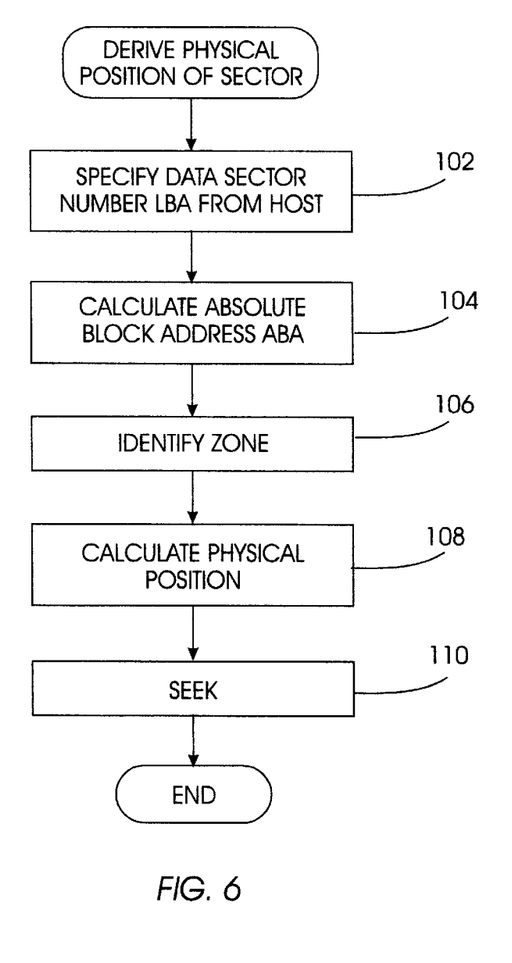
FIG. 6 is a flowchart showing the flow of the derivation of the physical position of a sector.

First, the derivation of the physical position of a target sector and the operation therefor are described with reference to the flowchart of FIG. 6. The host computer 32 provides the HDC 30 with a specification of a logical block address LBA which is the number of a sector, along with a request to write data or a request to read data (step 102). The HDC 30 refers to the above described defect list D_LST, and uses the above equation (1) to calculate an absolute block address ABA corresponding to the specified logical block address LBA by the all sectors including defective sectors (step 104). For instance, in the example of FIG. 3, if a logical block address LBA 07 is specified, the absolute block address ABA is calculated to be 10. Then, the zone table (Table 1) is referred to, thereby for identifying a zone Zn to which the calculated absolute block address ABA belongs (step 106). Subsequently, the physical position in the identified zone Zn is calculated as follows (step 108).

It is assumed that, when the host computer or the like requests to read a sector #M from a logical block address LBA #L, the corresponding absolute block address ABA is calculated to be #N, the zone Zn to which the absolute block address belongs is identified to be #Z, and the first absolute block address ABA is MIN_ABA (#Z) and the first cylinder is MIN_CYL (#Z). In this case, the absolute block address ABA (#M) can be expressed by the following equation (2).

$$\#N = \#ZN + MIN\_ABA(\#Z) \quad (2)$$

where #ZN is the serial number of a sector in the zone #Z corresponding to the logical block address LBA #L.

The above serial number #ZN of a sector can be expressed by the following equation (3).

$$\#ZN = \#S + (SCT\_TRK(\#Z).\#HD) + (SCT\_CYL(\#Z).\#ZCYL) \quad (3)$$

where SCT_TRK (#Z) is the number of sectors in one track in the zone #Z, and SCT_CYL (#Z) is the number of sectors in one cylinder in the zone #Z.

Accordingly, the head number (HD number), cylinder number (CYL number), and sector number (SCT number) of a magnetic disk for identifying the absolute block address ABA (#N) are as follows.

$$CYL\ number = \#CYL = \#MIN\_CYL(\#Z) + \#ZCYL\ HD\ number = \#HD\ SCT\ number = \#S \quad (4)$$

Based on the physical position calculated in this way, a so-called seek operation for switching the head and moving it to a cylinder is performed (step 110).

Figure 5:
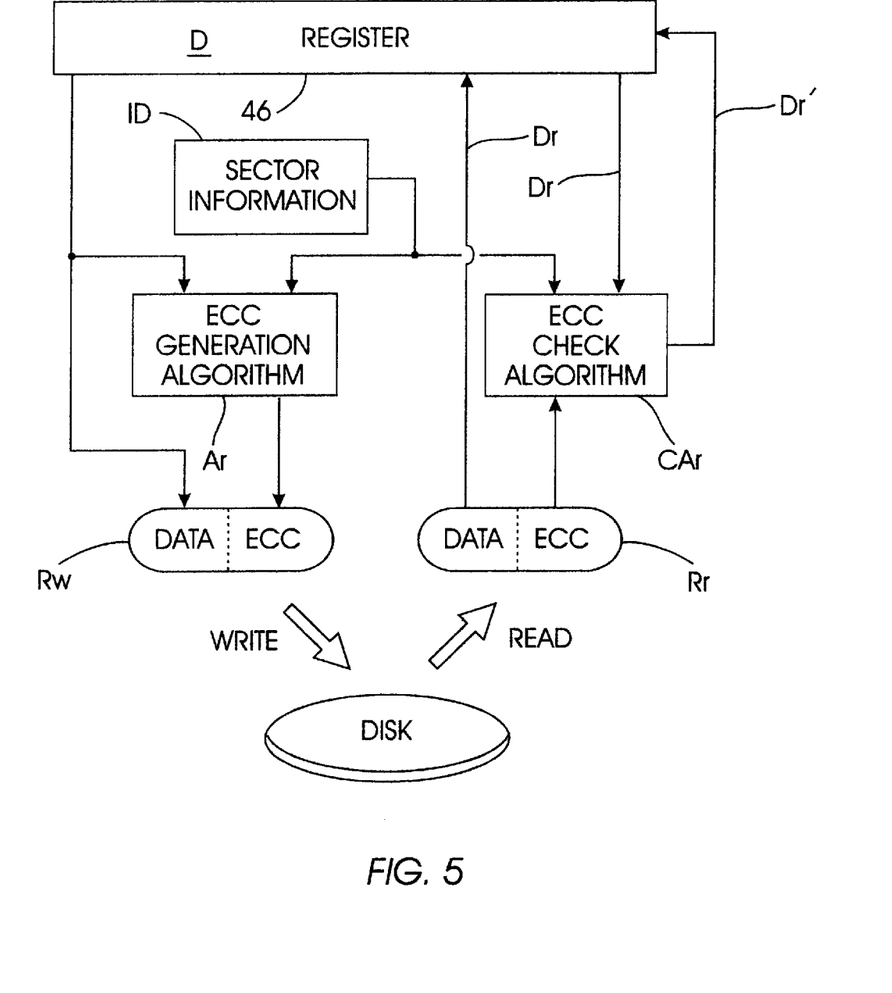
FIG. 5 is a view of the process concept of the reading and writing for ensuring data to be read or written on the disk.

Shown in FIG. 5 is a view of concepts for write and read processing for ensuring data to be read or written on a disk. When data D is written, the data D is stored in the register 46. Using the data D and the sector information on a sector to which the data D is written (sector number: in FIG. 5, it is output from a preset ID), an error correction code ECC is generated by an ECC generation algorithm Ar.

When user data D comprises 512 bytes(11001 11 . . . ) and LBA comprises 3 bytes (000110 . . .). LBA 3 bytes and DATA D 512 bytes are combined as one data comprising 515 bytes [(000110 . . . (LBA)1100111 . . . (D)]. From this 515 byte data (LBA+D), ECC is generated. For example, when the generated ECC comprises 20 bytes, the user data D (512 bytes) and generated ECC (20 bytes) are written on the disk. In other words, a record Rw made up of the user data D and the generated ECC is written to the disk. When writing new data after changing data read from the disk, this ECC generation step is executed based on the new user data.

When reading data from a disk, the user data Dr and ECC is read from the disk. The user data Dr in the record Rr is temporarily stored in the register 46. The stored data Dr is not output to host at this point of time. This stored user data bit sequence and the position information (LBA) bit sequence are combined. This combined 515 byte data is checked by ECC check algorithm CAr. In this ECC check, if no error is detected in the combined data of LBA and user data, the data is output from the register to host. When any error is detected by ECC error checking algorithm, the error location is identified. When an error location is detected in a portion of position information bit sequence, the read data is recognized as wrong data read from wrong portion on the disk. Then the read user data is not output from the register to host. When an error location is detected in a portion of the user data bit sequence, the error correction by ECC is executed and corrected data Dr' is sent to register 46 and it is output to host. When any error is not detected, the data without correction is output from the register to host.

In this way, the ECC written on the disk is generated from the combined data comprising both of user data and the position information which corresponds to the user data location on the disk. Therefore, by using the ECC, it is ensured that sector information and user data are put in an one-to-one relationship and this relation can be checked by ECC.

Figure 7:
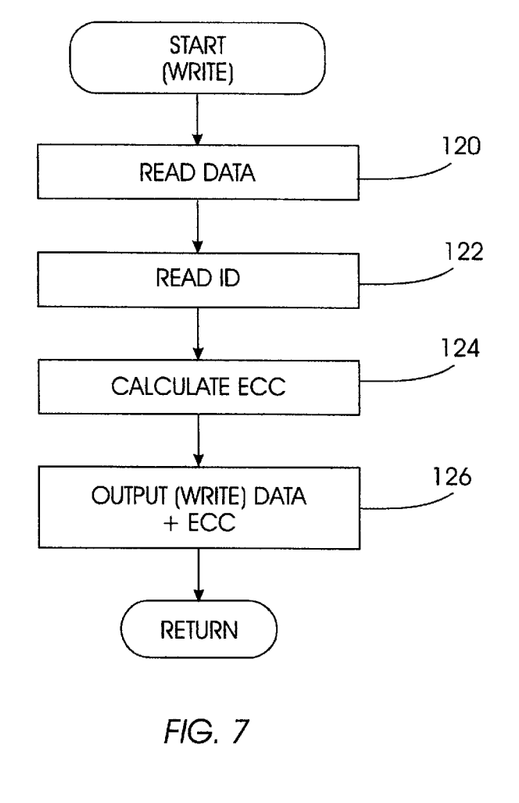
FIG. 7 is a flowchart showing the flow of the process for writing data to a sector.

Now, referring to the flowchart of FIG. 7, description is made to the data write processing requested by the host computer 32 after the target sector is sought.

In step 120 of FIG. 7, the user data to be written to the target sector is sent from the host computer 32. In the next step 122, a logical block address LBA which is a sector number is read as sector information corresponding to the target sector, and in the next step 124, data information made up of the sector information and user data is generated to calculate the ECC of the data information. In the subsequent step 126, a record consisting of the data to be written to the target sector plus the calculated ECC is output and written to the disk.

Figure 8:
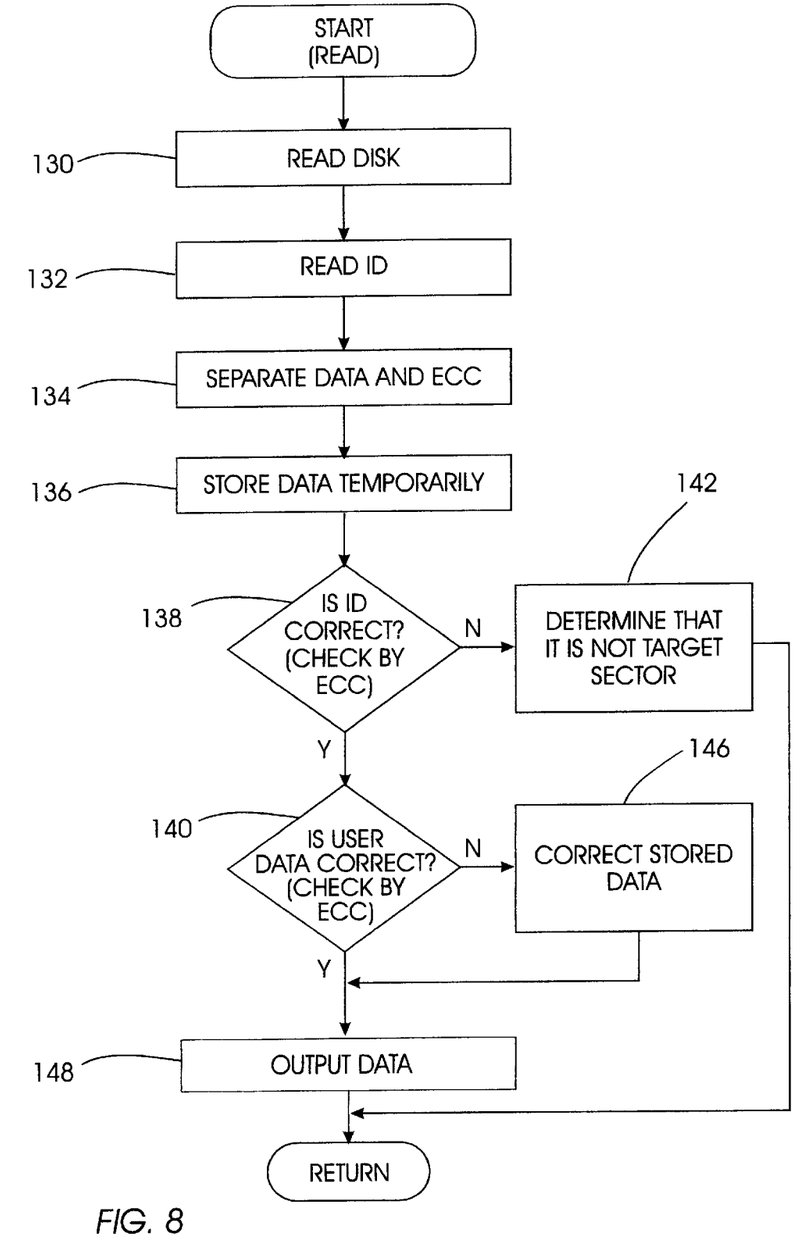
FIG. 8 is a flowchart showing the flow of the process for reading data from a sector.

Referring to the flowchart of FIG. 8, description is further made to the data read processing requested by the host computer 32 after the target sector is sought.

In step 130 of FIG. 8, a user data and ECC data stored in the target sector are read from the disk. In the next step 132, a logical block address LBA which includes a sector number is read as the sector information. This sector information is read from a memory in the system, and used for positioning the head to the target sector in data reading operation. And in the next step 134, the data and ECC are separated. In the subsequent step 136, the separated data is temporarily stored in the register 46.

In the next step 138, ECC check for ID is executed. In this step 138, it is determined whether or not the sector information corresponds to the target sector information. This determination is performed as follows. For example, when the read data comprises 512 bytes(1100111 . . . ) and the sector information LBA comprises 3 bytes(000110 . . . ), LBA 3 bytes and data 512 bytes are combined as one data comprising 515 bytes ((000110 . . . (LBA)1100111 . . . (Data)). And based on this combined 515 bytes data(LBA+D), ECC check is executed. It is to be noted that this ECC is read from the disk with the data in step 130. Because this read ECC was previously generated from the combined data comprising both the user data and the sector information which corresponds to the right sector location where the user data is stored, when the correspondence between the read user data and the sector information read from the memory is not correct, some errors can be detected by this ECC check. By this error check, when any error is detected in the sector information bit sequence portion, the determination result in step 138 is negative. This means the read record is not the data in the target sector, and thus, in the succeeding step 142, it is determined not to be the target sector and this routine is terminated.

On the other hand, if the determination in step 138 is positive, step 140 follows. The positive determination in step 138 means that any error is not found in the sector information bit portion. In this case, it can be recognized that the head has been accurately positioned in accordance with the designated position information. In the step 140, the read user data is checked by ECC. In this step, an error check for the user data portion in the combined data is executed. Because the read ECC has been generated from the combined data comprising both the sector information (ID) and the user data, the error in the user data can be determined by checking this combined data by read ECC. Then for error checking for the user data, the corresponding sector information must be combined. If any error is detected in the user data portion, after the error correction by the ECC in step 146, the corrected data is output to the host computer 32 (step 148). On the other hand, if there is no error, the data stored in the register 46 is directly output to the host computer 32.

One example of the error correction method using ECC is an interleaving method. For example, when ECC is generated from 3 bytes LBA and 512 byte user data, and the generated ECC has 20 bytes, these LBA, user data, and ECC bytes are aligned as one seaquence. Then these byte unit (symbol) locations are defined as follows. LBA byte location: 0, 1, 2. User data byte location: 3 to 515. ECC byte location: 516 to 534. Theses 534 bytes (3+512+20 bytes) are divided to three groups as follows. Interleave No.0 contains 0,3,6 . . . byte locations. Interleave No.1 contains 1,4,7 . . . byte locations. Interleave No.2 contains 2,5,8 . . . byte locations. For each interleaved group, Maximum 2 byte units (symbols) can be corrected by each ECC byte allotted to each corresponding interleaved group. In accordance with this interleaving method, 6 symbols' (48 bits) corrections in all can be performed.

By this method, when any error is detected in 0,1,2 byte location, this error is recognized as an error in LBA. If errors are detected in location 3 to 515, theses errors are recognized as user data errors. Since ECC stored in the disk is generated from the user data and the position information which corresponds to the sector where the user data is stored, it can be identified whether or not, the read user data is the data located in the target sector position by detecting an error in LBA byte location. Therefore, even if some errors occur when positioning the head and wrong data is read from a disk, such data's outputting can be prohibited.

Accordingly, even in a headerless disk in which no ID region is provided, the reliability of data integrity against the reading of different data due to drift or vibration of heads or some other reasons can be improved.

Although, the embodiment of the present invention has been described above, the technical principal matters of the embodiment of the present invention can be applied to any system which executes a head positioning operation by using position information previously provided to the head positioning controller.

Further, although, in the above embodiment, description has been made to the case in which an error correction process is executed in the HDD unit, the present invention is not limited to such a case. For instance, it is also possible that only a register for storing data to be written to a disk or only a register for storing data to be read from the disk is provided, and data is directly sent and received between the host computer and the above error correction process can be performed in the host computer.

In addition, although, in the foregoing, description has been made to the case in which the read/write processings are performed by software, the error correction process may of course be comprised of hardware such as electronic circuitry.

Furthermore, although, in the above embodiment, description has been made to the case in which the present invention is applied to a NO_ID disk in which servo regions are existed, only user data may be stored in the NO_ID disk without servo region. In this case, positional information for positioning a head may be read out from a memory device other than the disk. Alternatively, it may be previously stored to a predetermined particular portion on the disk (for instance, the innermost peripheral portion) and read previously.

As described above, in accordance with the present invention, an error correction code is generated from the combined data comprising both the user data the position information which corresponds to the user data storing sector location, and thus, there is an advantage that, even if one of the sector information and the data is different, it can be reliably detected.

What is claimed is:

1. In a data storage system having a disk and a transducer head which is positioned by using previously stored address information, a method for data processing comprising:
    generating an error correction code (ECC) from the combination of a user information data bit sequence and an address information bit sequence which corresponds to the position where the user information data is stored on the disk; and
    executing a write operation by writing the user information data and the generated ECC in the position designated by said address information.

2. In a data storage system having a disk having previously recorded user information data and a transducer head which is positioned by using previously stored address information, a method for data processing comprising:
    reading the previously recorded user information data and an error correction code (ECC) from the disk in accordance with a designated address information, said ECC having been generated from the user information data bit sequence and the address information bit sequence which corresponds to the position where said user information data is stored on the disk;
    combining the read user information data bit sequence and the designated address information bit sequence used for positioning the transducer head to form a combined bit sequence;
    determining whether or not, said combined bit sequence has any bit error by using said ECC read from the disk; and
    executing an error correction for the user information data by using said ECC read from the disk when said ECC detects any error in the position of user information data bit sequence.

3. In a data storage system having a disk and a transducer head which is positioned by using previously stored address information, a method for data processing comprising:
    reading the user information data and an error correction code (ECC) from the disk in accordance with a designated address information, in which ECC is generated from the user information data bit sequence and the address information bit sequence which corresponds to the position storing the user information data on the disk;
    combining the read user information data bit sequence and the designated address information bit sequence used for positioning the transducer head;
    determining if the bit sequence comprising both the address information and the user information data has any bit error by using ECC read from the disk;
    determining that the read user information data is not the target data stored in the position corresponding to the designated address information when the ECC detects an error in the address information bit sequence; and
    inhibiting user information data output when the ECC detects an error in the address information bit sequence.

4. In a data storage system having a disk and a transducer head which is positioned by using previously stored address information, a method for data processing comprising:
    reading the user information data and an error correction code (ECC) from the disk in accordance with a designated address information, said ECC having being generated from the user information data bit sequence and the address information bit sequence which corresponds to the position where said user information data are stored on the disk;
    combining the read user information data bit sequence and the designated address information bit sequence used for positioning the transducer head;
    determining if said combined bit sequence has any bit error by using said ECC read from the disk;
    executing an error correction for the user information data by using said ECC read from the disk when said ECC detects any error in the position of user information data bit sequence;
    generating an ECC from the combination of a new user information data bit sequence to be written on the disk and an address information bit sequence which corresponds to the position where the user information data is to be stored on the disk; and
    executing a write operation by writing the new user information data and the generated ECC in the position designated by said address information.

5. A data storage system having a disk and a transducer head comprising:
    memory means for storing address information for identifying the position of user information data on said disk;
    positioning means for positioning said transducer head in accordance with said address information;
    code generating means for generating an error correction code (ECC) from the combination of the user information data bit sequence and the address information bit sequence which corresponds to the position for storing said user information data on the disk; and
    data output means for outputting the user information data and the generated ECC for writing them on the disk.

6. A data storage system having a disk and a transducer head comprising:
    memory means for storing address information for identifying the position of user information data on said disk;
    positioning means for positioning said transducer head in accordance with said address information;
    means for reading the user information data and error correction code (ECC) from the disk in accordance with a designated address information, the ECC being generated from the user information data bit sequence and the address information bit sequence which corresponds to the position for storing said user information data on the disk;
    means for combining the user information data read from the disk and the address information used for positioning the actuator head in reading operation;
    means for identifying if the combined user information data and address information bit sequence has any error by using ECC read from the disk; and data correction means for correcting the user information data in accordance with the ECC read from the disk when the ECC detects an error in the position of user information data bit sequence.

7. A data storage system having a disk and a transducer head comprising:

memory means for storing address information for identifying the position of user information data on said disk;

positioning means for positioning said transducer head in accordance with said address information;

means for reading the user information data and error correction code (ECC) from the positioned location on the disk, the ECC being generated from the user information data bit sequence and the address information bit sequence which corresponds to the position for storing said user information data on the disk;

means for combining the user information data read from the disk and the address information used for positioning the actuator head in the user information data reading operation;

means for identifying if the combined user information data and the address information bit sequence has any error by using ECC read from the disk; and means for determining that the read user information data is not the target data stored in the position corresponding to the designated address information when the ECC detects an error in the portion of the address information bit sequence.

8. A data storage system as set forth in claim 7 further comprising data output inhibiting means for inhibiting the user information data output when the ECC detects an error in the address information bit sequences.

9. A data storage system as set forth in any one of claim 5 or 6 or 7, wherein the disk is a headerless disk having no sector position information in each sector.

* * * * *